United States Patent
Galvez (10) Patent No.: US 9,334,663 B2
(45) Date of Patent: May 10, 2016

(54) DOOR SUPPORT ASSEMBLY

(71) Applicant: Victor Manuel Galvez, Miami, FL (US)

(72) Inventor: Victor Manuel Galvez, Miami, FL (US)

( * ) Notice: Subject to any disclaimer, the term of this patent is extended or adjusted under 35 U.S.C. 154(b) by 204 days.

(21) Appl. No.: 13/945,098

(22) Filed: Jul. 18, 2013

(65) Prior Publication Data

US 2015/0020461 A1 Jan. 22, 2015

(51) Int. Cl.
*B23Q 1/64* (2006.01)
*E04F 21/18* (2006.01)

(52) U.S. Cl.
CPC .............. *E04F 21/1811* (2013.01); *B23Q 1/64* (2013.01)

(58) Field of Classification Search
CPC ................................ B23Q 1/64; E04F 21/1811
USPC ............. 414/11, 607, 226.05, 350, 408, 452, 414/592, 744.1, 601; 269/905, 152; 29/428; 280/79.7, 35, 47.28
See application file for complete search history.

(56) References Cited

U.S. PATENT DOCUMENTS

| | | | |
|---|---|---|---|
| 1,018,282 A | 2/1912 | Tsuda | |
| 2,682,076 A | 6/1954 | Christensen | |
| 2,967,627 A * | 1/1961 | Vinson | B62B 3/02 254/2 R |
| 3,643,935 A * | 2/1972 | Bell | 269/16 |
| 4,141,192 A * | 2/1979 | Augustine | E04F 21/0023 269/904 |
| 4,492,369 A | 1/1985 | Pohl | |
| 4,752,173 A * | 6/1988 | Fleming | 414/10 |
| 4,810,151 A * | 3/1989 | Shern | B62B 3/108 269/17 |
| 4,987,976 A * | 1/1991 | Daugherty | 187/243 |
| 5,164,011 A * | 11/1992 | Ray | 118/500 |
| 5,318,316 A * | 6/1994 | Shurtleff | B62B 1/268 269/133 |
| 5,584,363 A * | 12/1996 | Curtin | B66F 9/07559 187/232 |
| 5,814,842 A | 9/1998 | Dieckman | |
| 6,007,053 A * | 12/1999 | Huang | B60P 7/083 254/223 |
| 6,241,447 B1 * | 6/2001 | Echternacht | B62B 3/108 280/79.7 |
| 6,511,275 B2 * | 1/2003 | Ray | 414/11 |
| 6,702,130 B1 * | 3/2004 | Carlilse | B05B 13/0285 118/500 |
| 6,921,095 B2 * | 7/2005 | Middleby | 280/47.29 |
| 7,008,165 B1 * | 3/2006 | Grimes | 414/589 |
| 7,014,413 B2 * | 3/2006 | Young | B62B 3/108 269/905 |
| 7,325,817 B1 * | 2/2008 | Jankowski | 280/79.7 |
| 7,448,598 B1 * | 11/2008 | Elmlinger | B66D 1/28 254/338 |
| D592,822 S * | 5/2009 | Boucher | D34/31 |
| 7,874,047 B2 * | 1/2011 | Breeden | 24/68 CD |
| D659,342 S * | 5/2012 | Cichetti | D34/33 |
| 8,220,780 B2 | 7/2012 | Guillore | |
| 8,296,230 B2 | 10/2012 | Davis | |
| 8,424,884 B1 * | 4/2013 | Nicol | B62B 1/12 280/47.28 |
| 2004/0076501 A1* | 4/2004 | McGill | B62B 3/008 414/607 |
| 2005/0040618 A1* | 2/2005 | Beatty | B62B 3/108 280/79.3 |
| 2006/0076543 A1* | 4/2006 | Williamson | 254/325 |
| 2006/0197072 A1* | 9/2006 | Huang | B60P 7/083 254/217 |
| 2007/0018417 A1* | 1/2007 | Ponce | B62B 1/268 280/79.7 |
| 2009/0047110 A1* | 2/2009 | Wilkie | B66F 9/06 414/592 |
| 2010/0102284 A1* | 4/2010 | Drake | 254/1 |
| 2011/0214274 A1* | 9/2011 | Holder | B23P 11/00 29/428 |
| 2012/0068131 A1* | 3/2012 | Latoria | B66D 3/18 254/339 |
| 2013/0086845 A1* | 4/2013 | High | B66F 15/00 49/506 |

* cited by examiner

*Primary Examiner* — Monica Carter
*Assistant Examiner* — Mahdi H Nejad (57) ABSTRACT

A door support assembly that raises and lowers a door in a series of measurable, successive steps through a ratcheting mechanism. The door assembly also includes additional lateral ratchets and straps that help secure the door against a vertical support structure for enhanced stability. The door support assembly is utilized for the installation and removal of a door from a door frame, and transport of the door.

7 Claims, 7 Drawing Sheets

FIG. 7

DOOR SUPPORT ASSEMBLY

BACKGROUND

The present invention is directed to a door support assembly that raises and lowers a door for installation and removal in a series of discrete, measurable steps while providing lateral and vertical stability.

The inventor of the present invention has worked in the door installation industry most of his life. The doors he usually deals with encompass an opening and closing structure used to block off an entrance, typically consisting of an interior side that faces the inside of a space and an exterior side that faces the outside of that space.

The inventor recognized that most doors are hinged along one side to allow the door to pivot away from the doorway in one direction but not in the other. The axis of rotation is usually vertical. In some cases, such as hinged garage doors, the axis may be horizontal, above the door opening. These doors typically position inside a door frame, and hinge between the interior and exterior space to open and close, respectively. A door frame hinge aligns with the door hinge to allow a pin to pass through. The pin secures the two hinges together, thereby installing the door.

Typically, installation or removal of the door required the inventor to lift the door from the door hinge on one side of the door frame. This lifting often required an additional person to help, due to the weight of the door, and stability required to remove the pin from the hinges. This excessive labor often resulted in back pain, and damaged door frames.

The above realizations caused him to first create a vertical support structure that moved up and down to raise and lower the door. A door brace attached to the bottom of the vertical support structure to slide underneath the door. Yet, the doors were still too heavy to raise. So the inventor recognized that a simple machine to magnify the lifting force, such as a ratchet would facilitate the lifting and lowering of the door. The ratchet also allowed for measurable, successive steps to lift and lower the door.

Through additional trial and error, the assembly was still imperfect because the door would slide off the vertical support structure. The inventor recognized that attaching straps around the door and at the door periphery, which could be tightened with a ratchet, would stabilize the lateral direction of the door.

After using the assembly with these novel changes, the inventor noticed that the top of the door would scrape against a lateral bar he had attached for additional lateral stability. The inventor finally added a pair of rollers on the lateral bar to help diminish the effects of friction as the door was raised and lowered.

In the past, door support assemblies have been used to raise and lower doors from their hinges. The inventor of this present invention believes that a door support assembly configured to his specifications has helped stabilize, measure, and facilitate the raising and lowering of doors for installation and removal. This was an unexpected result.

A door support assembly has been used for raising and lowering doors in the past, yet none with the present characteristics of the present invention. See U.S. Pat. Nos. 4,141,192; 4,492,369; 5,814,842; 8,220,780; and 4,620,828.

For the foregoing reasons, there is a door support assembly that raises and lowers a. door for installation and removal in a. series of discrete, measurable steps while providing lateral and vertical stability.

SUMMARY

The present invention is directed to a door support assembly that will support, raise, and lower a door in a series of successive steps, that will facilitate installation and removal of the door from a door frame, and that will transport the door while providing lateral and vertical stability, The present invention is a door support assembly. The door support assembly utilizes a substantially vertical support structure and a series of ratchet mechanisms to raise and lower the door in a series of successive, measurable steps. Additional ratchets positioned along the vertical support structure help secure the door laterally against the vertical support structure for enhanced stability.

In some embodiments, the door support assembly comprises a base. The base comprises a lateral axis that forms a junction with a rear axis to form a substantially T-shape. The rear axis includes a weight for providing a counterweight to the door. The weight rests in proximity to a terminal end of the rear axis. The door support assembly further includes a lower vertical support, which extends in a vertical direction from the base to provide a lower support to the door. An upper vertical support extends upwardly from the lower vertical support to providing upper support to the door, whereby the door leans and presses against both the lower vertical support and the upper vertical support. In one embodiment, the upper vertical support may adjustably raise and lower in relation to the lower vertical support such that variously sized and dimensioned doors may be supported. A door brace is disposed to join at a lower end of the lower vertical support. The door brace has a substantially L-shape configured to press against two surfaces of the door, and slide between the door and a ground surface. The door brace, in essence grips the door for raising and lowering.

In one embodiment, a vertical ratchet is disposed to operatively join with the door brace through a ratchet belt, which serves to pull the door brace up in response to the vertical ratchet tightening the ratchet belt, or release the door brace in response to the vertical ratchet reversibly releasing the ratchet belt. The ratchet belt extends between the door brace and the vertical ratchet, stretching and relaxing in conjunction with the operative demands of the vertical ratchet. The vertical ratchet includes a vertical rotary gear engaged by a vertical pawl to raise and lower the door brace in a series of successive steps. A lever joins the vertical rotary gear to operate the vertical ratchet. In some embodiments, a pair of lateral ratchets is disposed to join with the upper vertical support in a horizontal direction for providing lateral support to the door. Each lateral ratchet includes a strap that extends laterally along the door. A lateral bar may attach to the lower vertical assembly and provide a terminal slot for each strap to wrap around. Each strap terminates at a strap bracket that clamps around a periphery of the door. Each lateral ratchet includes a lateral rotary gear engaged by a lateral pawl to increase and decrease tension on each strap in a series of successive steps. In this manner, the periphery of the door is stabilized against the upper vertical support and the lower vertical support. In some embodiments, upper lateral ratchet joins with the upper vertical support in a horizontal direction for ratcheting an upper strap in a series of successive steps. The upper strap serves to help press the door against the upper vertical support. The upper strap encompasses the door for enhanced stability and control of the door during raising, lowering, and transporting. The upper lateral ratchet further includes an upper lateral rotary gear engaged by an upper lateral pawl to increase and decrease tension on the upper strap in a series of successive steps. In some embodiments, a lateral bar extends horizontally along the upper vertical support to provide further lateral support to the door. At least one wheel protrudes from the lateral bar to engage the door. The at least one wheel helps inhibit friction between the lateral bar and the door by providing a rolling surface for the door wile raising or lowering.

An object of the present invention is to provide a door support assembly that will stabilize a door while unhinging from a door frame, and facilitate transport of the door from the door frame.

Another object of the present invention is to provide a door support assembly that will stabilize a door while hinging to a door frame.

Another object of the present invention is to provide calibrated, premeasured units of movement for lifting and lowering the door.

A further object of the present invention is to stabilize the door by pressing the door against the vertical supports with lateral straps that form a tight wrapping around the door, and strap brackets that clamp around the periphery of the door.

DRAWINGS

These and other features, aspects, and advantages of the present invention will become better understood with regard to the following description, appended claims, and drawings where:

DESCRIPTION

One embodiment of the door support assembly 100 is seen in FIGS. 1-7. The door support assembly 100 is used to provide a stable platform for installing and removing a door 102 to a door frame. Those skilled in the art, in light to of the present teachings, will recognize that the door 102 includes hinged ends that must align with a hinge and pin on a door frame for installation and removal. The door 102 must be lifted so that the door hinge abuts the door frame hinge, and a pin passes through both sets of hinges. The door support assembly 100 is operable to raise and lower the door 102 in a series of discrete, successive steps that are small enough to accurately remove and affix the door hinge in alignment with the door frame hinge. The door frame assembly 100 is operable to engage numerous styles of hinged doors 102. Suitable materials for fabricating the door support assembly 100 may include, without limitation, steel, titanium, metal alloy, fiberglass, high density polymer, and wood.

Figure 1:
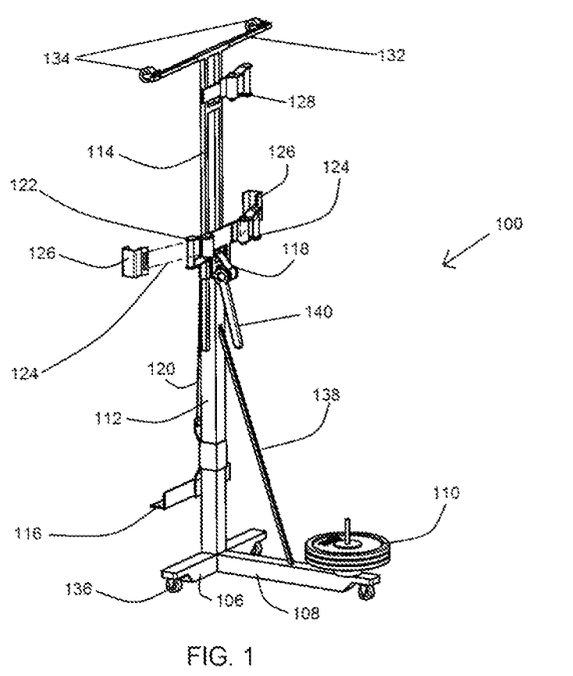
FIG. 1 is a perspective view of the present invention.
Figure 2A:
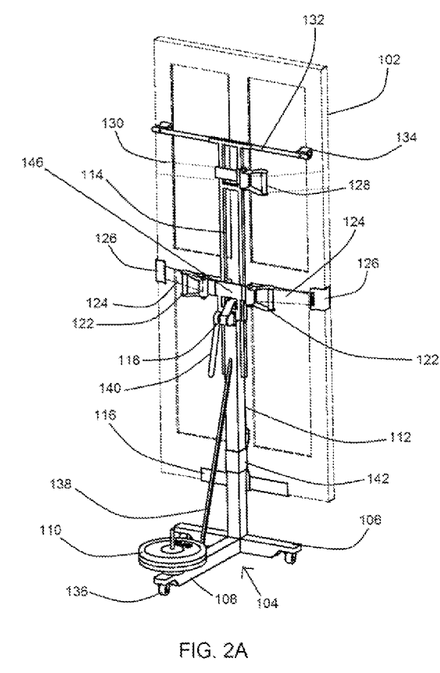
FIGS. 2A and 2B are rear and front views of the present invention joined with a door.
Figure 2B:
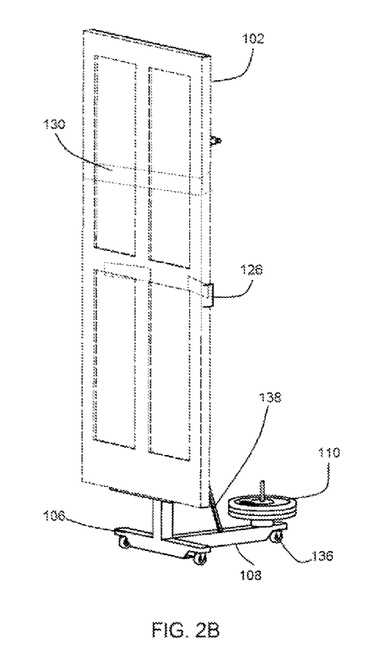
Figure 3:
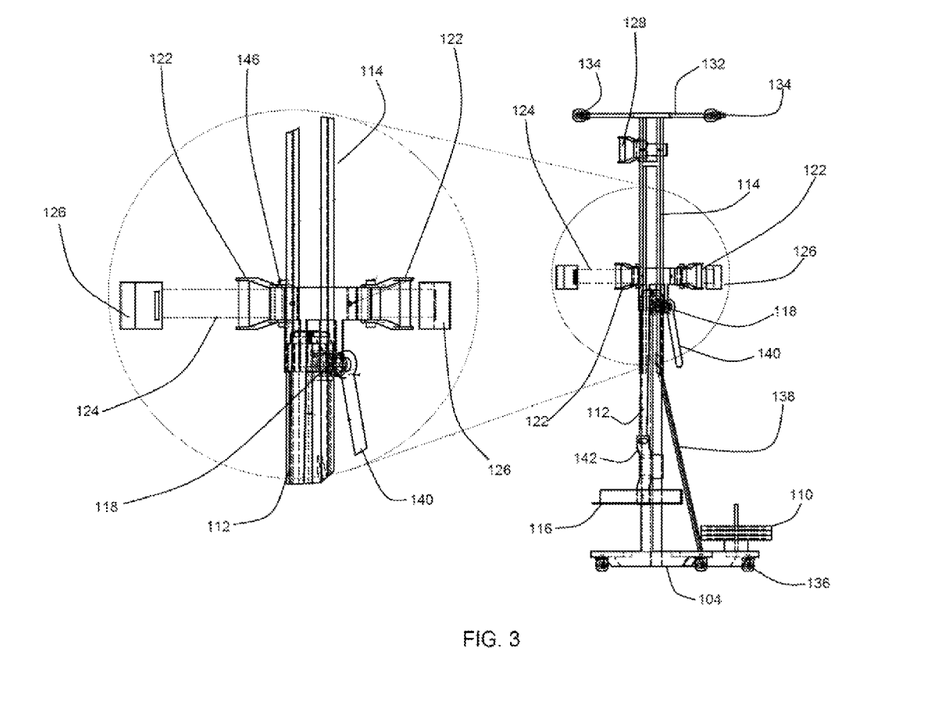
FIG. 3 is a blow up view of a pair of lateral ratchets and a vertical ratchet.

In one embodiment of the present invention, the door support assembly 100 comprises a base 104. The base 104 forms the foundational support for the door support assembly 100 and the door 102, as referenced in FIG. 1. The base 104 comprises a. lateral axis 106 that forms a. junction with a rear axis 108 to form a substantially T-shape. The rear axis 108 includes a weight 110 for providing a counterweight to the door 102. The weight 110 rests in proximity to a terminal end of the rear axis 108. The weight 110 may include circular weights with a central aperture. A vertical rod extending from the rear axis 108 may pass through the aperture for securing the weights 110. In some alternative embodiments, the base 104 may be shaped and configured differently from a T-shape, yet perform the substantially same function of providing a foundation support for the door support assembly 100 and the door 102. In some embodiments, the base 104 includes at least one base wheel 136 for transporting the door support assembly 100 and the door 102, The door support assembly 100 further includes a lower vertical support 112, which extends in a vertical direction from the base 104 to provide a lower support to the door 102 (FIGS. 2A and 2B). An upper vertical support 114 extends upwardly from the lower vertical support 112 to providing upper support to the door 102, whereby the door 102 leans and presses against both the lower vertical support 112 and the upper vertical support 114. In one embodiment, the upper vertical support 114 may adjustably raise and lower in relation to the lower vertical support 112 such that variously sized and dimensioned doors 102 may be supported. The upper vertical support 114 may extend upwardly to a height up to 9'. In some embodiments, a rear brace 138 extends diagonally from the lower vertical support 112 to the rear axis 108 to provide additional support for the door 102.

Figure 4:
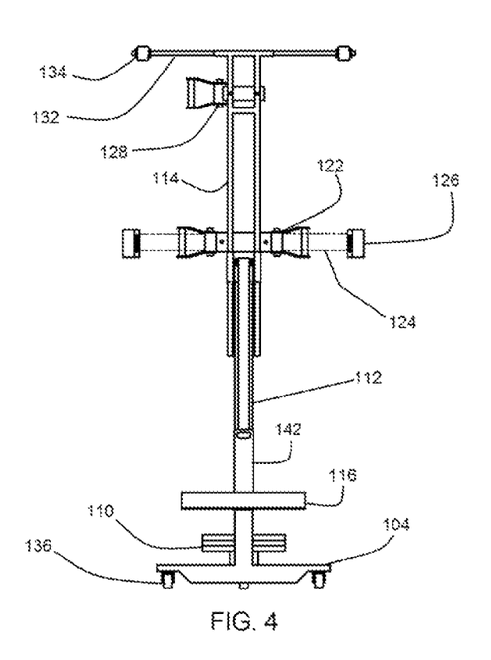
FIG. 4 is a front view of the present invention.

In one embodiment, a door brace 116 is disposed to join at a lower end of the lower vertical support. 112. The door brace 116 has a substantially L-shape configuration. The door brace 116 is configured to press against a rear surface and a lower surface of the door 102, thereby forming a 90° to better grip the door 102. In this manner, the door brace 116 may slide between the door 102 and a ground surface. In some embodiments, a vertical ratchet 118 operatively joins with the door brace 116 through a ratchet belt 120, as referenced in FIG. 3. The ratchet belt 120 lifts the door brace 116 up in response to the vertical ratchet 118 tightening the ratchet belt 120 in a series of successive steps. The torque of the vertical ratchet 118 may be adjusted by a wrench to help lift heavy doors 102. The ratchet belt 120 may also release the door brace 116 in response to the vertical ratchet 118 reversibly releasing the ratchet belt 120. In one alternative embodiment, a measuring unit displays the height of the door brace 116, or the amount of successive steps the door brace 116 has been raised or lowered. The ratchet belt 120 extends between the door brace 116 and the vertical ratchet 118, stretching and relaxing in conjunction with the operative demands of the vertical ratchet 118. A door brace link 142 connects the door brace 116 to the ratchet belt 120 (FIG. 4). The vertical ratchet 118 includes a vertical rotary gear engaged by a vertical pawl to raise and lower the door brace 116 in a series of successive steps. A lever 140 joins the vertical rotary gear to operate the vertical ratchet 118.

Figure 5:
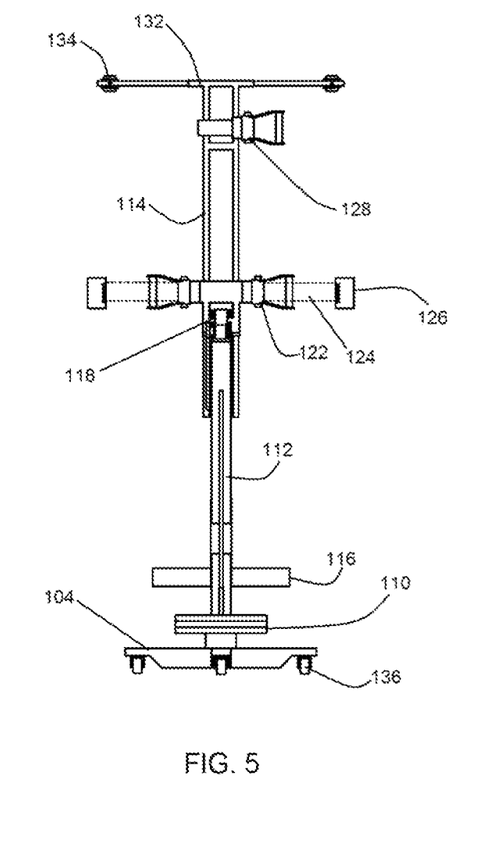
FIG. 5 is a front view of the present invention.
Figure 6:
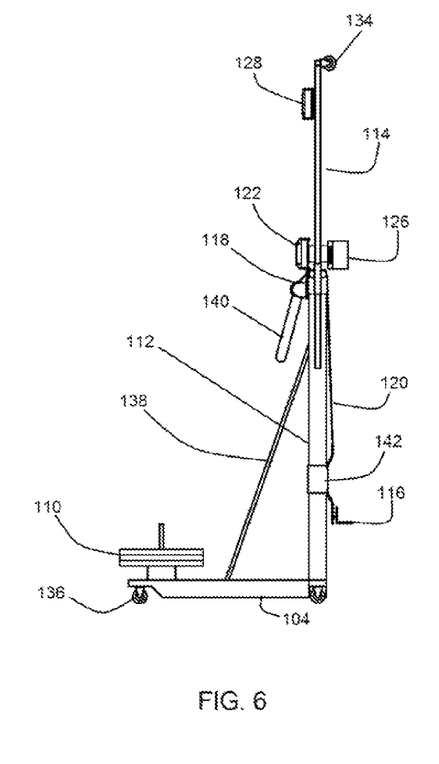
FIG. 6 is a side view of the present invention.
Figure 7:
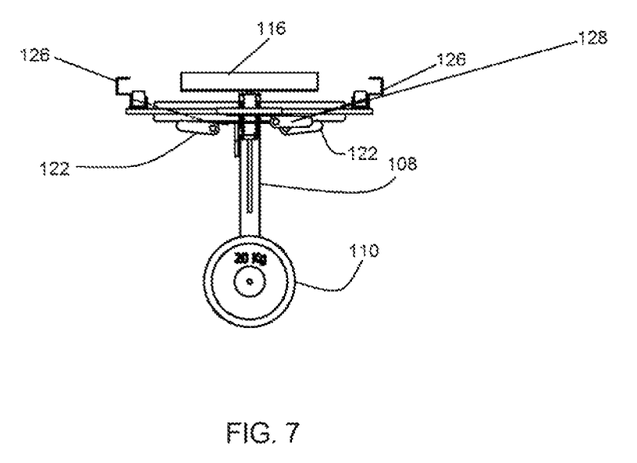
FIG. 7 is a top view of the present invention.

In some embodiments, a pair of lateral ratchets 122 is disposed to join with the upper vertical support 114 in a horizontal direction for providing lateral support to the door 102. Each lateral ratchet 122 includes a strap 124 that extends laterally along the door 102. A lateral ratchet connector 146 may attach to the lateral ratchet 122 and provide a terminal slot for each strap 124 to wrap around. Each strap terminates at a strap bracket 126 that clamps around a door periphery. The lateral ratchet 122, in a series of successive steps, either tightens or loosens the clamp of the strap bracket 126 around the door periphery. Each lateral ratchet 122 includes a lateral rotary gear engaged by a lateral pawl to increase and decrease tension on each strap 124 in a series of successive steps. In this manner, the periphery of the door is stabilized against the upper vertical support 114 and the lower vertical support 112 (FIG. 5).

In one embodiment an upper lateral ratchet 128 joins with the upper vertical support 114 in a horizontal direction for ratcheting an upper strap 130 in a series of successive steps. The upper strap 130 serves to help press the door 102 against the upper vertical support 114. The upper strap 130 encompasses the door 102 for enhanced stability and control of the door 102 during raising, lowering, and transporting. The upper lateral ratchet 128 further includes an upper lateral rotary gear engaged by an upper lateral pawl to increase and decrease tension on the upper strap 130 in a series of successive steps.

In one embodiment of the present invention, a lateral bar 132 extends horizontally along the upper vertical support 114 to provide further lateral support to the door 102. The lateral bar 132 is shorter than the door brace 116, and provides an upper support for the door 102. At least one roller 134 protrudes from the lateral bar 132 to engage the door 102. The at least one roller 134 helps inhibit friction between the lateral bar 132 and the door 102 by providing a rolling surface for the door 102 while raising or lowering. The at least one roller 134 is horizontally adjustable to compensate for variously sized doors 102, and positioning around door frames, as referenced in FIGS. 5, 6 and 7.

An advantage of the present invention is that the vertical ratchet 118 raises and lowers the door 102 in a series of measurable steps.

Another advantage of the present invention is that heavy doors can be raised and lowered due to the force magnifying effect of the vertical ratchet 118.

Yet another advantage to this present invention is that the at least one base wheel 136 provides mobility during positioning of the door brace 116 underneath the door 102, and during transport of the door 102.

Although the present invention has been described in considerable detail in reference to preferred versions, other versions are possible. Therefore, the spirit and scope of the appended claims should not be limited to the description attic preferred versions contained herein.

What is claimed is:

1. A door support assembly for supporting, raising, and lowering a door, the door support assembly comprising:
   a base having a lateral axis joined with a rear axis to form a substantially T-shape, the rear axis having a weight for providing a counterweight to the door;
   a lower vertical support extending in a vertical direction from the base for providing a lower support to the door;
   an upper vertical support extending upwardly from the lower vertical support for providing an upper support to the door, wherein the lower vertical support and the upper vertical support form a unitary single column;
   a door brace disposed to join with the lower vertical support, the door brace having a substantially L-shape for positioning underneath the door;
   a vertical ratchet disposed to operatively join with the door brace through a ratchet belt, the vertical ratchet having a vertical rotary gear engaged by a vertical pawl to raise and lower the door brace in a series of successive steps, a lever attaches to the vertical rotary gear thereby forming a vertically ratcheting system;
   a pair of lateral ratchets disposed to join with the upper vertical support in a horizontal direction for providing lateral support to the door, each lateral ratchet having a strap, each strap having a strap bracket for attaching to a periphery of the door, each lateral ratchet further having a lateral rotary gear engaged by a lateral pawl to increase and decrease tension on each strap in a series of successive steps;
   an upper lateral ratchet disposed to join with the upper vertical support in a horizontal direction for securing the door to the upper vertical support, the upper lateral ratchet having an upper strap for encompassing the door, the upper lateral ratchet further having an upper lateral rotary gear engaged by an upper lateral pawl to increase and decrease tension on the upper strap in a series of successive steps; and
   a lateral bar, the lateral bar disposed to join with the upper vertical support in a horizontal direction for providing additional lateral support to the door, the lateral bar having at least one roller to help inhibit friction between the lateral bar and the door.

2. The door support assembly of claim 1, wherein the base comprises at least one base wheel for transporting the door support assembly and the door.

3. The door support assembly of claim 1, further comprising a rear brace disposed to extend from the rear axis to the lower vertical support for providing additional vertical support for the door.

4. The door support assembly of claim 1, wherein the upper vertical support adjusts vertically.

5. The door support assembly of claim 1, wherein a door brace link joins the door brace with the ratchet belt.

6. The door support assembly of claim 1, wherein the lateral bar adjusts horizontally.

7. The door support assembly of claim 1, further including a wrench for adjusting the units for each successive step of the vertical ratchet, the wrench being disposed to attach to the lateral bar.

\* \* \* \* \*